US008738554B2

(12) United States Patent
Modha

(10) Patent No.: US 8,738,554 B2
(45) Date of Patent: May 27, 2014

(54) EVENT-DRIVEN UNIVERSAL NEURAL NETWORK CIRCUIT

(75) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 13/235,343

(22) Filed: Sep. 16, 2011

(65) Prior Publication Data

US 2013/0073494 A1    Mar. 21, 2013

(51) Int. Cl.
*G06N 3/08* (2006.01)

(52) U.S. Cl.
USPC .......................................................... 706/25

(58) Field of Classification Search
CPC .................................................... G06N 3/063
USPC ............................................................ 706/25
See application file for complete search history.

(56) References Cited

U.S. PATENT DOCUMENTS

| | | | |
|---|---|---|---|
| 4,893,255 | A | 1/1990 | Tomlinson, Jr. |
| 5,331,550 | A | 7/1994 | Stafford et al. |
| 5,646,868 | A | 7/1997 | Ueda et al. |
| 5,764,860 | A | 6/1998 | Yatsuzuka |
| 5,768,476 | A | 6/1998 | Sugaya et al. |
| 7,430,546 | B1 | 9/2008 | Suri |
| 7,543,266 | B2 | 6/2009 | Brown |
| 7,953,683 | B2 | 5/2011 | Minamino et al. |
| 7,996,342 | B2 | 8/2011 | Grabarnik et al. |
| 2008/0071712 | A1 | 3/2008 | Cecchi et al. |
| 2008/0091628 | A1 | 4/2008 | Srinivasa et al. |
| 2008/0162391 | A1 | 7/2008 | Izhikevich |
| 2010/0049677 | A1 | 2/2010 | Jaros et al. |
| 2010/0179935 | A1 | 7/2010 | Srinivasa et al. |
| 2012/0311595 | A1 | 12/2012 | Saha et al. |

(Continued)

FOREIGN PATENT DOCUMENTS

| WO | 2008112921 A1 | 9/2008 |
|---|---|---|
| WO | 2009006735 A1 | 1/2009 |

OTHER PUBLICATIONS

Pham, H.T. et al., "Controlling Multi-Class Error Rates for MLP Classifier by Bias Adjustment based on Penalty Matrix", Proceedings of the 6th International Conference on Ubiquitous Information Management and Communication (ICUIMC'12), Feb. 20-22, 2012, pp. 1-9, ACM, United States.

(Continued)

*Primary Examiner* — Jeffrey A Gaffin
*Assistant Examiner* — Ola Olude Afolabi
(74) *Attorney, Agent, or Firm* — Kenneth L. Sherman, Esq.; Michael Zarrabian, Esq.; Sherman & Zarrabian LLP

(57) ABSTRACT

The present invention provides an event-driven universal neural network circuit. The circuit comprises a plurality of neural modules. Each neural module comprises multiple digital neurons such that each neuron in a neural module has a corresponding neuron in another neural module. An interconnection network comprising a plurality of digital synapses interconnects the neural modules. Each synapse interconnects a first neural module to a second neural module by interconnecting a neuron in the first neural module to a corresponding neuron in the second neural module. Corresponding neurons in the first neural module and the second neural module communicate via the synapses. Each synapse comprises a learning rule associating a neuron in the first neural module with a corresponding neuron in the second neural module. A control module generates signals which define a set of time steps for event-driven operation of the neurons and event communication via the interconnection network.

15 Claims, 9 Drawing Sheets

(56) References Cited

U.S. PATENT DOCUMENTS

| | | |
|---|---|---|
| 2013/0073493 A1 | 3/2013 | Modha |
| 2013/0159229 A1 | 6/2013 | Modha |
| 2013/0159231 A1 | 6/2013 | Modha |
| 2014/0019393 A1 | 1/2014 | Modha et al. |

OTHER PUBLICATIONS

U.S. Notice of Allowance for U.S. Appl. No. 13/325,321 mailed Aug. 29, 2013.

Hahnloser, R., "Learning Algorithms Based on Linearization," Network: Computation in Neural System, Aug. 1998, pp. 363-380, vol. 9, No. 3, Informa Healthcare, United Kingdom.

Cios, K.J. et al., "Advances in Applications of Spiking Neuron Networks," Proceedings of the SPIE Applications and Science of Computational Intelligence III Conference, 2000, pp. 324-336, vol. 4055, SPIE, United States.

Buonomano, D.V. et al., "State-Dependent Computations: Spatiotemporal Processing in Cortical Networks," Nature Reviews Neuroscience, 2009, pp. 113-125, vol. 10, No. 2, Macmillan Publishers Limited, United States.

Huerta, R. et al., "Fast and Robust Learning by Reinforcement Signals: Explorations in the Insect Brain," Letter in Neural Computation, Aug. 2009, pp. 2123-2151, vol. 21, No. 8, Massachusetts Institute of Technology Press, United States.

Seeger, M.W. et al., "Bayesian Inference and Optimal Design for the Sparse Linear Model," Journal of Machine Learning Research (JMLR), Jun. 1, 2008, pp. 759-813, vol. 9, Massachusetts Institute of Technology Press and Microtome Publishing, United States.

Upegui, A. et al., "An FPGA Platform for On-line Topology Exploration of Spiking Neural Networks," Microprocessors and Microsystems, 2005, pp. 211-223, vol. 29, No. 5, Elsevier B.V., The Netherlands.

Schaal, S. et al., "Computational Approaches to Motor Learning by Imitation," Philosophical Transactions of the Royal Society B: Biological Sciences, Mar. 29, 2003, pp. 537-547, vol. 358, No. 1431, The Royal Society, London, United Kingdom.

Swinehart, C.D. et al, "Dimensional Reduction for Reward-based Learning", Network: Computation in Neural Systems, Sep. 2006, pp. 235-252, vol. 17, Issue 3, Informa Healthcare, United Kingdom.

Ijspeert, A.J., "Central patter generators for locomotion control in animals and robot: A review", Neural Networks 21, Mar. 7, 2008, pp. 642-653, Elsevier, Untied States.

Righetti, L. et al., "Dynamic Hebbian leariang in adaptive frequency oscillators", Scienedirect Physica D 216, 2006, pp. 269-281, Elsevier, United States.

Anonyomous, Basic Conceptions for Neural Networks (BCNN), "Basic concepts for neural networks", Neural Network Technology, pp. 1-6, Cheshire Engineering Corporation, downloaded Dec. 22, 2013 from http://www.cheshireng.com/Neuralyst/nnbg.htm.

U.S. Non-Final Office Action for U.S. Appl. No. 13/235,342 mailed Dec. 26, 2013.

U.S. Non-Final Office Action for U.S. Appl. No. 13/325,316 mailed Dec. 16, 2013.

U.S. Notice of Allowance for U.S. Appl. No. 13/325,316 mailed Mar. 28, 2014.

EVENT-DRIVEN UNIVERSAL NEURAL NETWORK CIRCUIT

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, an event-driven universal neural network circuit.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

The present invention relates to an event-driven universal neural network circuit. In one embodiment, the present invention provides a neural network circuit comprising a plurality of neural modules, wherein each neural module comprises multiple digital neurons such that each neuron in a neural module has a corresponding neuron in another neural module. An interconnection network comprising a plurality of digital synapses interconnects the plurality of neural modules. Each synapse interconnects a first neural module to a second neural module by interconnecting a neuron in the first neural module to a corresponding neuron in the second neural module such that corresponding neurons in the first neural module and the second neural module communicate via the synapses. Each synapse comprises a learning rule associating a neuron in the first neural module with a corresponding neuron in the second neural module. A control module generates signals which define a set of time steps for event driven operation of the neurons and event communication via the interconnection network.

In another embodiment, the present invention provides a method comprising performing event-driven spiking computation in a neural network circuit comprising a plurality of neural modules. Each neural module includes multiple digital neurons such that every neuron in a first neural module is connected to a corresponding neuron in a second neural module via an interconnect network of synapses. Each synapse includes a learning rule associating a neuron in the first neural module with a corresponding neuron in the second neural module. Event-driven spiking computation comprises generating signals which define a set of time steps for event-driven operation of the neurons and event communication via the interconnect network. At each time step, each neuron updates its operational state. Based on its operational state, each neuron determines whether to generate a firing event in response to firing events received as input signals from corresponding neurons in other neural modules. Each received input signal is weighted by a synaptic weight of the synapse communicating the input signal to the neuron.

These and other features, aspects and advantages of the present invention will become understood with reference to the following description, appended claims and accompanying figures.

DETAILED DESCRIPTION

Figure 1:
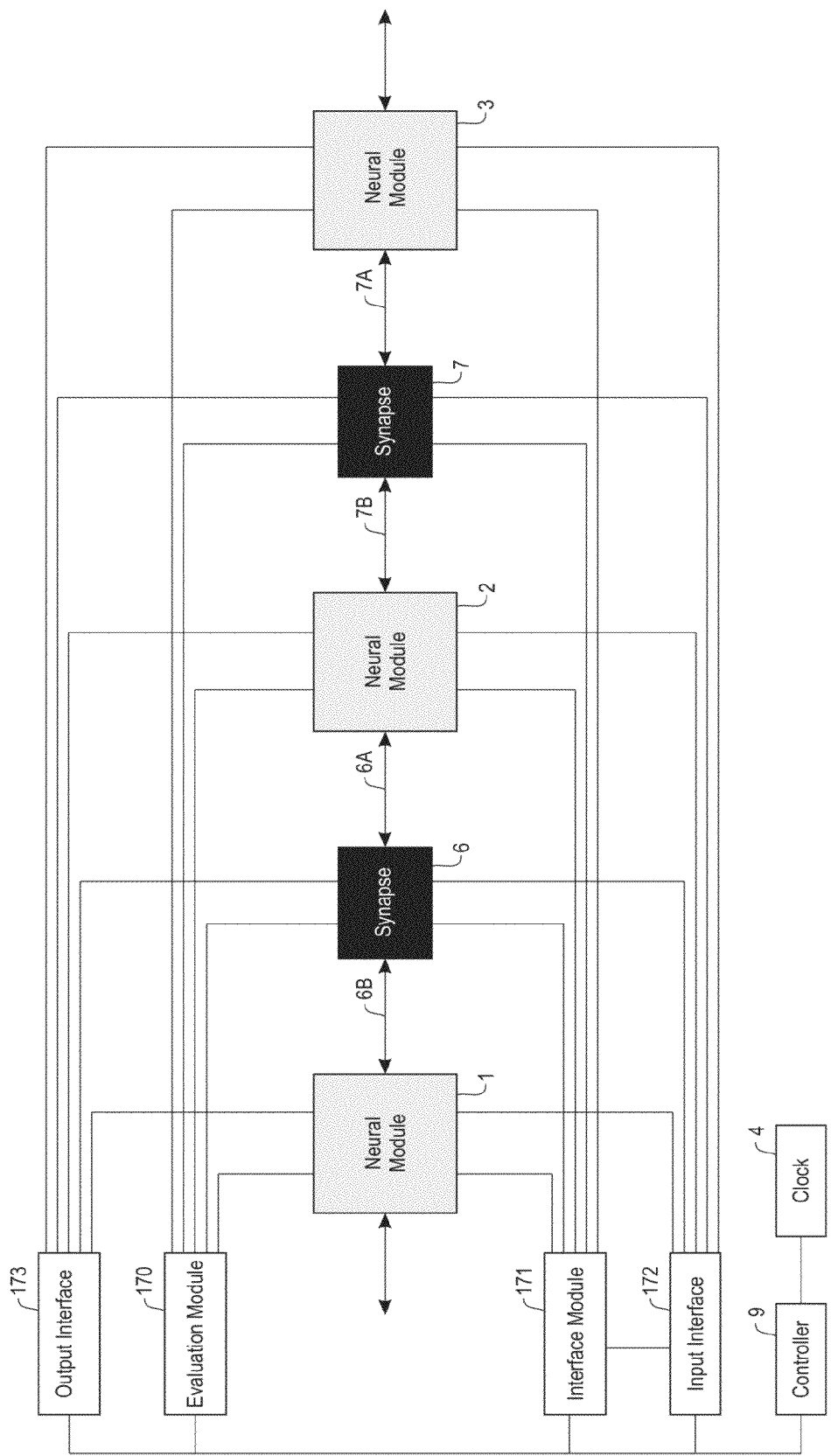
FIG. 1 illustrates a neural network circuit, in accordance with an embodiment of the invention.

The present invention relates to an event-driven universal neural network circuit. In one embodiment, the present invention provides a neural network circuit comprising a plurality of neural modules, wherein each neural module comprises multiple digital neurons such that each neuron in a neural module has a corresponding neuron in another neural module. An interconnection network comprising a plurality of digital synapses interconnects the plurality of neural modules. Each synapse interconnects a first neural module to a second neural module by interconnecting a neuron in the first neural module to a corresponding neuron in the second neural module such that corresponding neurons in the first neural module and the second neural module communicate via the synapses. Each synapse comprises a learning rule associating a neuron in the first neural module with a corresponding neuron in the second neural module. A control module generates signals which define a set of time steps for event driven operation of the neurons and event communication via the interconnection network.

In another embodiment, the present invention provides a method comprising performing event-driven spiking computation in a neural network circuit comprising a plurality of neural modules. Each neural module includes multiple digital neurons such that every neuron in a first neural module is connected to a corresponding neuron in a second neural module via an interconnect network of synapses. Each synapse includes a learning rule associating a neuron in the first neural module with a corresponding neuron in the second neural module. Event-driven spiking computation comprises generating signals which define a set of time steps for event-driven operation of the neurons and event communication via the interconnect network. At each time step, each neuron updates its operational state. Based on its operational state, each neuron determines whether to generate a firing event in response to firing events received as input signals from corresponding neurons in other neural modules. Each received input signal is weighted by a synaptic weight of the synapse communicating the input signal to the neuron.

Each neuron has an operational state. Based on its operational state, each neuron generates a firing event in response to one or more firing events received as input signals from corresponding neurons in other neural modules via connected synapses. Each said input signal is weighted by said weight of the synapse communicating the input signal to the neuron.

Each neural module generates a firing event vector indicating which neurons in the neural module generated a firing event. The weights of all synapses in the interconnection network are adaptive as a function of the history of the firing event vectors from the first and the second neural modules.

An interface module updates learning rules in one or more synapses in the interconnection network. A learning rule for learning false negatives or unlearning false positives is applied to a synapse in the interconnection network when a neuron interconnected with the synapse generates a firing event.

Each neuron comprises a reconfigurable digital complementary metal-oxide-semiconductor (CMOS) circuit for logic and memory elements for its operational state. Each synapse between two neural modules comprises a reconfigurable digital CMOS circuit for logic and memory elements for its operational state. Each synapse between two neural modules further comprises a communication link implemented via a combination of logical and physical primitives.

Embodiments of the invention provide an event-driven design for a universal neural network circuit. Embodiments of the invention further provide an adaptive neural network circuit that can interface in real-time with spatiotemporal sensorium and motorium to carry out tasks of perception including unsupervised learning, action including supervised learning, and cognition including reinforcement learning, in a noise-robust, self-tuning, and self-configuring fashion. Embodiments of the invention further provide a neural network circuit that provides locality and massive parallelism to enable a low-power, compact hardware implementation.

The term digital neuron as used herein represents an architecture configured to simulate a biological neuron. A digital neuron creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

An external two-way communication environment may supply sensory inputs and consume motor outputs. Digital neurons implemented using CMOS logic gates receive spike inputs and integrate them. The neurons include comparator circuits that generate spikes when the integrated input exceeds a threshold. In one embodiment, binary synapses are implemented using transposable 1-bit static random access memory (SRAM) cells, wherein each neuron can be an excitatory or inhibitory neuron. Each learning rule on each neuron axon and dendrite are reconfigurable.

A neural network circuit can be represented as a directed graph, with neurons represented by vertices, and synapses between neurons represented by directed edges, each edge associated with a synaptic weight.

FIG. 1 illustrates a neural network circuit 5 implementing an embodiment of spiking computation according to the present invention, as described herein. The example neural network 5 comprises multiple neural modules, such as neural modules 1, 2, and 3. Each neural module comprises multiple neurons (see, for example, neural module 200 in FIG. 2B comprising neurons $l_i^\uparrow$, $l_i^\downarrow$, $u_i^\uparrow$, and $u_i^\downarrow$).

The neural network circuit 5 further comprises multiple synapses, synapses 6 and 7. The synapse 6 interconnects every neuron in the neural module 1 to a corresponding neuron in the neural module 2. The synapse 7 interconnects every neuron in the neural module 2 to a corresponding neuron in the neural module 3.

In general, in accordance with an embodiment of this invention, each synapse interconnects only two neural modules. In this specification, any two neural modules a synapse interconnects is generally referred to as "neural module A" and "neural module B". Each synapse comprises only two ports, a first port connecting the synapse to the "neural module A", and a second port connecting the synapse to the "neural module B". In this specification, the first port and the second port of a synapse are generally referred to as "port A" and "port B", respectively.

Referring back to FIG. 1, the synapse 6 has two ports, port 6A and port 6B. The port 6A is a "port A" type, and the port 6B is a "port B" type. The synapse 6 is connected to the neural module 2 and the neuron module 1 via the port 6A and the port 6B, respectively. Similarly, the synapse 7 has two ports, port 7A and port 7B. The port 7A is a "port A" type, and the port 7B is a "port B" type. The synapse 7 is connected to the neural module 3 and the neural module 2 via the port 7A and the port 7B, respectively.

Further, each synapse 6, 7 comprises learning rules. The synapse 6 comprises a learning rule associating a neuron in the neural module 1 with a corresponding neuron in the neural module 2. The synapse 6 comprises a learning rule associating a neuron in the neural module 2 with a corresponding neuron in the neural module 3.

Also shown in FIG. 1, the neural network 5 further comprises a control module ("controller") 9 that is connected to a clock 4. The clock 4 produces clock signals used by the controller 9 to generate time-steps. The controller 9 divides each time-step into operational phases in the neural network for neuron updates, etc. In one embodiment, operation of the neural network 5 is driven by time-steps (e.g., based on biological time-steps), wherein within a time-step multiple neuron updates and synapse updates are sequentially handled in a read phase and a write phase, respectively, utilizing the clock 4. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

Also shown in FIG. 1, an input interface 172 provides input to some neurons in the neural modules. An output interface 173 receives output from some neurons in the neural modules. An evaluation module 170 evaluates the output of some neurons in the neural module. An interface module 171 updates the learning rules of the synapses in the neural network circuit. The neural network 5 can comprise more than one output interface, one input interface, one evaluation module and/or one interface module.

Figure 2A:
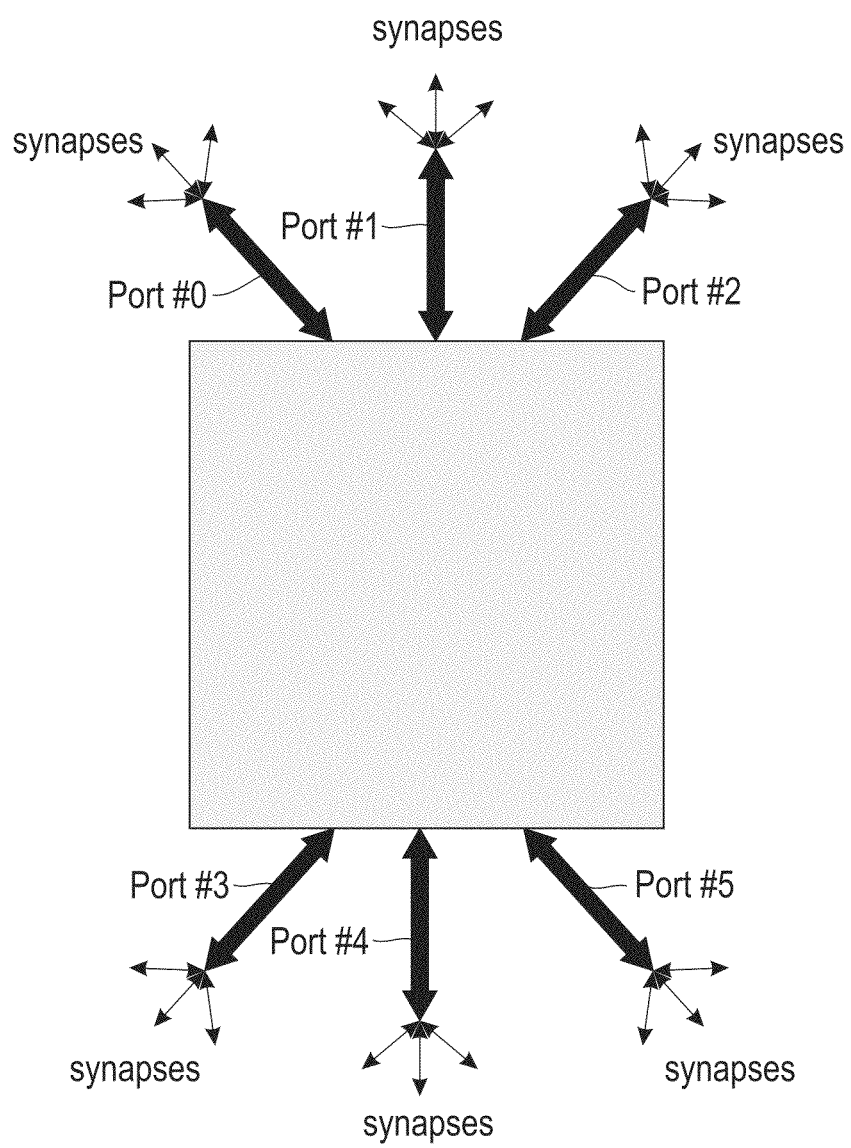
FIG. 2A illustrates a structure of a neural module, in accordance with an embodiment of the invention.

FIG. 2A illustrates a structure of a neural module 100 (an example of neural module 1 in FIG. 1), in accordance with an embodiment of the invention. Every neural module can interconnect with multiple different neural modules, and each such connection is mediated via a synapse. Each neural module comprises an x number of ports. Each port of a neural module may be connected to one or more synapses. Some ports of a neural module may be empty. The neural module 100 comprises multiple ports, such as ports #0, #1, #2, #3, #4, and #5. As shown in this figure, each port of the neural module 100 is connected to a plurality of synapses.

With respect to each connection to a synapse, a port of a neural module is classified as one of two types, "port A" or "port B". If a port of a neural module is a "port A" type, the port connects the neural module to a "port A" of a synapse. If a port of a neural module is a "port B" type, the port connects the neural module to a "port B" of a synapse.

Figure 2B:
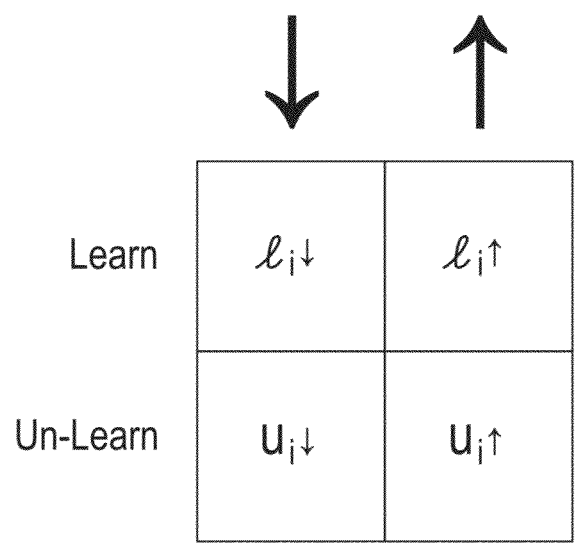
FIG. 2B illustrates a structure of neural module, in accordance with an embodiment of the invention.

FIG. 2B illustrates the structure of a neural module 200 (an example of neural module 1 in FIG. 1), in accordance with an embodiment of the invention. Each neural module comprises a p number of neurons. For instance, the neural module 200 comprises four neurons, neurons $l_i^\uparrow$, $l_i^\downarrow$, $u_i^\uparrow$, and $u_i^\downarrow$. There are four types of neurons: a neuron in a learning, bottom-up pathway; a neuron in a learning, top-down pathway; a neuron in an unlearning, bottom-up pathway; and, a neuron in an unlearning, top-down pathway.

Figure 3:
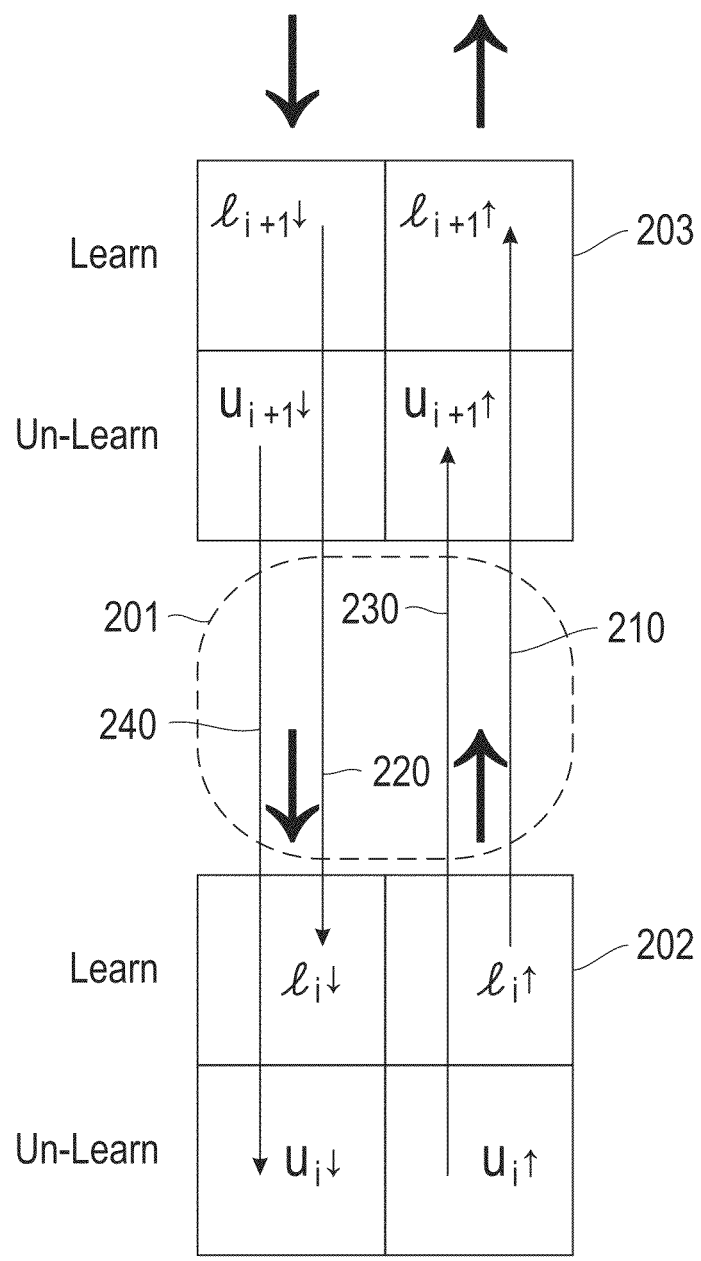
FIG. 3 illustrates a synapse interconnecting two neural modules, in accordance with an embodiment of the invention.

In FIG. 2B, the neuron $l_i^\uparrow$ is a neuron in a learning, bottom-up pathway (e.g. learning, bottom-up pathway 210 in FIG. 3), the neuron $l_i^\downarrow$ is a neuron in a learning, top-down pathway (e.g. learning, top-down pathway 220 in FIG. 3), the neuron $u_i^\uparrow$ is a neuron in an unlearning, bottom-up pathway (e.g. unlearning, bottom-up pathway 230 in FIG. 3), and the neuron is a neuron in an unlearning, top-down pathway (e.g. unlearning, top-down pathway 240 in FIG. 3).

In general, in accordance with an embodiment of the invention, the data structure of a neural module comprises the following: x ports, and p neurons. For every port, the data structure of the neural module further comprises a list of all synapses that the port is connected to, the sum of the synaptic weights of all synapses the port is connected to, and a target for the sum of the synaptic weights. If the sum of the synaptic weights is over or under the target, the learning rules of the synapses in the neural network circuit are updated.

For every neuron in the neural module, the data structure of the neural module further comprises a membrane potential of the neuron, a last firing time of the neuron, a list of ports in the neural module that the neuron's output will go to, and a list of ports in the neural module that the neuron's input will come from.

In general, in accordance with an embodiment of the invention, the data structure of a synapse comprises the following: the synaptic weight of the synapse, the delay of the synapse, a pointer to "neural module A", and a pointer to "neural module B". The data structure of the synapse further comprises information relating to the most recent communication the synapse had with the "neural module A" and the "neural module B". Such information includes the last synaptic weight sent to the "neural module A", the last synaptic weight sent to the "neural module B", the last spiking times of the p neurons in the "neural module A", and the last spiking times of the p neurons in the "neural module B".

The synapse data structure further comprises $p^2$ learning rules. Each learning rule is denoted as R[a][b], wherein a is the index of a neuron in the neural module A, and b is the index of a neuron in the neural module B. Some of the learning rules may be null.

Each neural module has $p(p-1)/2$ coupling efficiencies between neurons and its associated learning rules.

FIG. 3 illustrates a synapse 201 (example of synapse 6 in FIG. 1) interconnecting a neural module 202 (example of neuron 1 in FIG. 1) with a neural module 203 (example of neuron 2 in FIG. 1), in accordance with an embodiment of the invention. Each neural module 202, 203 comprises exactly four neurons. The neural module 202 comprises neurons $l_i^\uparrow$, $l_i^\downarrow$, $u_i^\uparrow$, and $u_i^\downarrow$, and the neural module 203 comprises neurons $l_{i+1}^\uparrow$, $l_{i+1}^\downarrow$, $u_{i+1}^\uparrow$, and $u_{i+1}^\downarrow$. Each neuron $l_i^\uparrow$, $l_i^\downarrow$, $u_i^\uparrow$, and $u_i^\downarrow$ in the neural module 202 has a one-to-one relationship with the neuron $l_{i+1}^\uparrow$, $l_{i+1}^\downarrow$, $u_{i+1}^\uparrow$, and $u_{i+1}^\downarrow$ in the neural module 203, respectively.

As shown in FIG. 2B, the synapse 201 operates in four contexts. In the first context, the neurons $l_i^\uparrow$ and $l_{i+1}^\uparrow$ are neurons in a learning, bottom-up pathway 210 and information flows from the neuron $l_i^\uparrow$ to the neuron $l_{i+1}^\uparrow$ though the synapse 201. In the second context, the neurons $l_i^\downarrow$ and $l_{i+1}^\downarrow$ are neurons in a learning, top-down pathway 220 and information flows from the neuron $l_{i+1}^\downarrow$ to the neuron $l_i^\downarrow$ through the synapse 201. In the third context, the neurons $u_i^\uparrow$ and $u_{i+1}^\uparrow$ are neurons in an unlearning, bottom-up pathway 230 and information flows from the neuron $u_i^\uparrow$ to the neuron $u_{i+1}^\uparrow$ through the synapse 201. In the fourth context, the neurons $u_i^\downarrow$ and $u_{i+1}^\downarrow$ are neurons in an unlearning, top-down pathway 240 and information flows from the neuron $u_{i+1}^\downarrow$ to the neuron $u_{i+1}^\downarrow$ through the synapse 201.

With respect to the synapse 201, the neurons $l_i^\uparrow$, $l_{i+1}^\downarrow$, $u_i^\uparrow$, and $u_{i+1}^\downarrow$ are pre-synaptic neurons and the neurons $l_{i+1}^\uparrow$, $l_i^\downarrow$, $u_{i+1}^\uparrow$, and $u_i^\downarrow$ are post-synaptic neurons.

In one example, the neural modules 202 and 203 can be treated as the "neural module A" and the "neural module B" that the synapse 201 is connected to, respectively. The data structure for the synapse 201 includes the synaptic weight of the synapse 201, the delay of the synapse 201, a pointer to the neural module 202, a pointer to the neural module 203, the last weight sent to the neural module 202, the last weight sent to the neural module 203, the last spiking times of the four neurons $l_i^\uparrow$, $l_i^\downarrow$, $u_i^\uparrow$, and $u_i^\downarrow$ in the neural module 202, and the last spiking times of the four neurons $l_{i+1}^\uparrow$, $l_{i+1}^\downarrow$, $u_{i+1}^\uparrow$, and $u_{i+1}^\downarrow$ in the neural module 203. The data structure for the synapse 201 further comprises sixteen ($p^2=16$, where p=4) learning rules. There is a learning rule associating each neuron ($l_i^\uparrow$, $l_i^\downarrow$, $u_i^\uparrow$, and $u_i^\downarrow$) in the neural module 202 with each neuron ($l_{i+1}^\uparrow$, $l_{i+1}^\downarrow$, $u_{i+1}^\uparrow$, and $u_{i+1}^\downarrow$) in the neural module 203. Some of the learning rules may be null.

In one time step, each neuron in every neuron module updates its operational state and, based on its operational state, each said neuron determines whether to generate a firing event in response to firing events received as input signals by said neuron from neurons in other neural modules. Each said input signal is weighted by the weight of the synapse communicating said input signal to said neuron. The synaptic weight associated with each synapse is adapted as a function of the firing events of the interconnected neurons.

The synapses in the neural network are event-driven. The synaptic weight associated with each synapse is adapted as a function of the firing events of the interconnected neurons.

In general, in accordance with an embodiment of the invention, at a given time-step, a neural module processes all synaptic messages received via its ports. The membrane potential of each neuron in the neural module is then evaluated to determine which neurons fired. A p bit vector is created, the vector indicating which of the p neurons in the neural module fired (a "1" bit at index i indicates that a neuron in the neural module at index i fired).

The firing of at least one neuron in a neural module is an event. The event is communicated to all synapses that the ports of the neural module are connected to. The neural module sends to all synapses connected to its ports of type "port A" the following information: the p bit vector, an extra bit representing the port ID of the port (the type of the port, that is "port A"), and a ratio representing the sum of all synaptic weights on the port over the target. Similarly, the neural module sends to all synapses connected to its ports of type "port B" the following information: the p bit vector, an extra bit representing the port ID of the port (the type of the port, that is "port B"), and a ratio representing the sum of all synaptic weights on the port over the target.

Further, for every neuron in the neural module that fired, the coupling efficiency between the neuron that fired and every other neuron is updated according to the learning rule.

If a synapse connected to a port of type "port A" of the neural module receives a p bit vector and a port ID "A", the synapse will identify this information as coming from the "neural module A". The synapse will send to the "neural module B" the following information: the p bit vector received from the "neural module A", the weight of the synapse, the delay of the synapse, and the last weight sent to the neural module B. Further, for every bit in the p bit vector received that is "1", learning rules associating a neuron that fired in neural module A with a neuron in neural module B are applied.

Similarly, if a synapse connected to a port of type "port B" of the neural module receives a p bit vector and a port ID "B", the synapse will identify this information as coming from the "neural module B". The synapse will send to the "neural module A" the following information: the p bit vector received from the "neural module B", the weight of the synapse, the delay of the synapse, and the last weight sent to the neural module A. Further, for every bit in the p bit vector received that is "1", learning rules associating a neuron that fired in neural module B with a neuron in neural module A are applied.

The computational architecture for the present invention provides for different types of synapses, wherein each synapse type includes a different specification for learning rules. Every synapse has a symmetric dual. A symmetric dual for a synapse is defined by reversing the roles of the synapse's $p^2$ learning rules. Each learning rule in a symmetric dual of a synapse is represented as R[b][a]. If the learning rule R[b][a] is not the same as R[a][b], the symmetric dual of the synapse provides a different synapse type. If the learning rule R[b][a] is the same as R[a][b], the symmetric dual of the synapse is the synapse itself.

Figure 4:
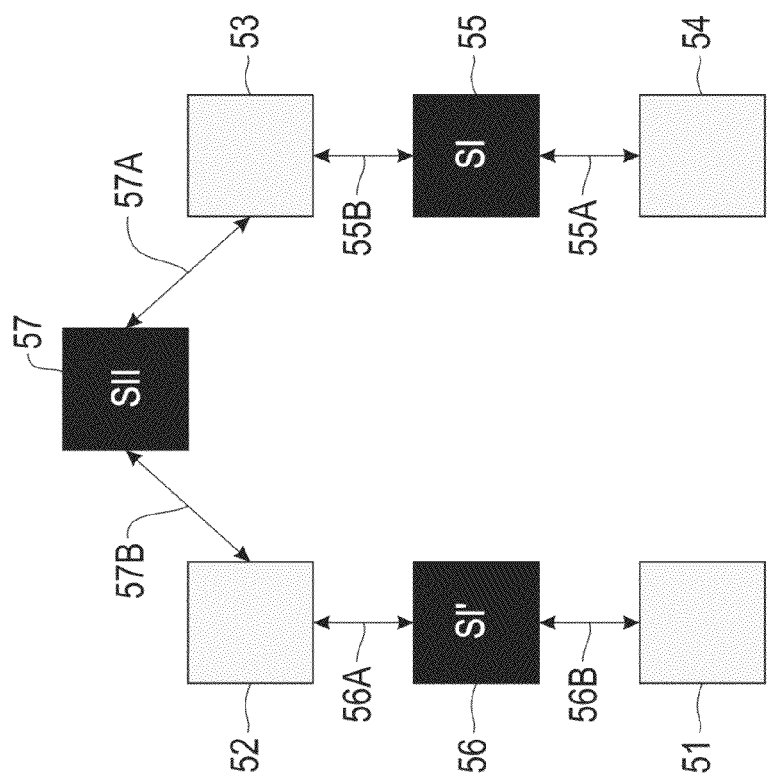
FIG. 4 illustrates a neural network circuit, in accordance with an embodiment of the invention.

FIG. 4 illustrates a neural network circuit 50, in accordance with an embodiment of the invention. The neural network circuit 50 comprises four neural modules, neural modules 51, 52, 53, and 54, and three synapses, synapses 55, 56, and 57. Each neural module 51, 52, 53, and 54 comprises p neurons (see, for example, neural module 200 in FIG. 2B comprising neurons $l_i^\uparrow$, $l_i^\downarrow$, $u_i^\uparrow$, and $u_i^\downarrow$).

As discussed above, each synapse comprises two ports. In FIG. 4, the synapse 55 comprises a first port 55A and a second port 55B. The ports 55A and 55B are "port A" and "port B" of the synapse 55, respectively. Similarly, the synapse 56 comprises a first port 56A and a second port 56B. The ports 56A and 56B are "port A" and "port B" of the synapse 56, respectively. The synapse 57 comprises a first port 57A and a second port 57B. The ports 57A and 57B are "port A" and "port B" of the synapse 57, respectively.

The synapse 55 is connected to the neural modules 54 and 53 via ports 55A and 55B, respectively. The synapse 55 interconnects every neuron in the neural module 54 with a corresponding neuron in the neuron module 53. The synapse 56 is connected to the neuron modules 52 and 51 via ports 56A and 56B, respectively. The synapse 56 interconnects every neuron in the neural module 52 with a corresponding neuron in the neuron module 51. The synapse 57 is connected to the neural modules 53 and 52 via ports 57A and 57B, respectively. The synapse 57 interconnects every neuron in the neural module 53 with a corresponding neuron in the neuron module 52.

In FIG. 4, the synapse 55 comprises $p^2$ learning rules, each learning rule associating a neuron in the neural module 54 with a corresponding neuron in the neural module 53. The synapse 55 has a first synapse type SI.

The synapse 56 comprises $p^2$ learning rules, each learning rule associating a neuron in the neural module 52 with a corresponding neuron in the neural module 51. The synapse 56 is a symmetric dual of the synapse 55. The $p^2$ learning rules in the synapse 55 are reversed to obtain a different set of $p^2$ learning rules for the synapse 56. The synapse 56 has a second synapse type SI'.

Finally, the synapse 57 comprises a set of $p^2$ learning rules that differs from the learning rules of synapses 55 and 56. The synapse 57 has a third synapse type SII. Each learning rule in the synapse 57 associates a neuron in the neural module 53 with a corresponding neuron in the neural module 52. Accordingly, only three different types of synapses (SI, SI', SII) are represented in FIG. 4.

The neural network circuit 50 in FIG. 4 can be used to implement a universal neural network circuit for unsupervised, supervised and reinforced learning via spiking computation.

Figure 5:
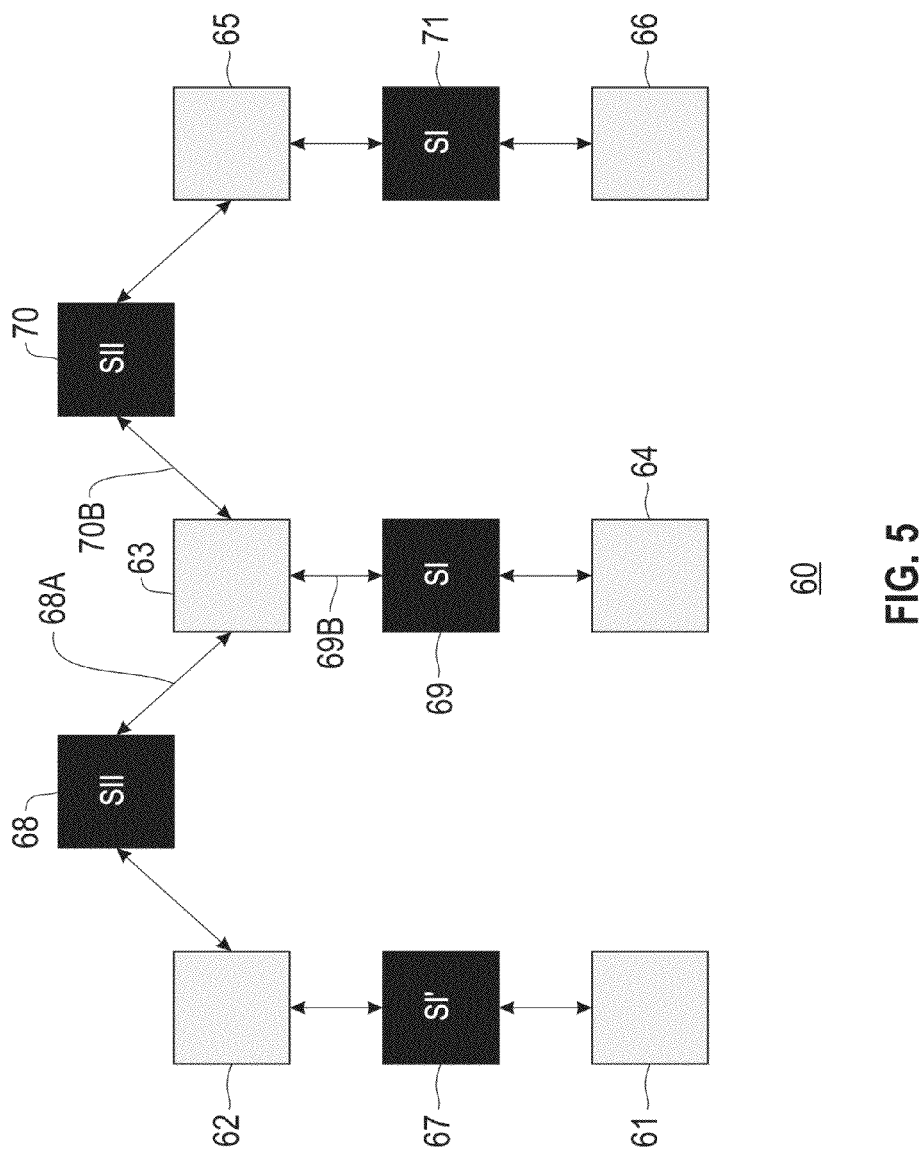
FIG. 5 illustrates a neural network circuit, in accordance with an embodiment of the invention.

FIG. 5 illustrates a neural network circuit 60, in accordance with an embodiment of the invention. The neural network circuit 60 comprises six neural modules, neural modules 61, 62, 63, 64, 65, and 66, and five synapses, synapses 67, 68, 69, 70, and 71. Each neural module 61, 62, 63, 64, 65, and 66 comprises p neurons (see, for example, neural module 200 in FIG. 2B comprising neurons $l_i^\uparrow$, $l_i^\downarrow$, $u_i^\uparrow$, and $u_i^\downarrow$).

The synapse 67 interconnects every neuron in the neural module 61 with a corresponding neuron in the neuron module 62. The synapse 68 interconnects every neuron in the neural module 62 with a corresponding neuron in the neuron module 63. The synapse 69 interconnects every neuron in the neural module 63 with a corresponding neuron in the neuron module 64. The synapse 70 interconnects every neuron in the neural module 63 with a corresponding neuron in the neuron module 65. The synapse 71 interconnects every neuron in the neural module 65 with a corresponding neuron in the neuron module 66.

As discussed above, a neural module can have multiple ports. In FIG. 5, the neural module 63 is connected to three different synapses. The neural module 63 is connected to a port 70B of the synapse 70, a port 69B of the synapse 69, and a port 68A of the synapse 68. With respect to synapses 69 and 70, the neural module 63 is a "neural module B". With respect to synapse 68, the neural module 63 is a "neural module A".

Further, FIG. 5 represents three different synapse types. The synapses 69 and 71 have the same synapse type SI, each synapse comprising the same set of $p^2$ learning rules. The synapse type SI' of the synapse 67 is a symmetric dual of the synapse type SI. The $p^2$ learning rules in synapses 69, 71 are reversed to obtain a different set of $p^2$ learning rules for the synapse 67. Finally, the synapses 68 and 70 have the same synapse type SII, each synapse comprising a set of $p^2$ learning rules that differs from the learning rules of 67, 69, and 71.

The neural network circuit 60 in FIG. 5 can be used to implement a neural network circuit combining multiple sensory and motor modalities into one computational architecture. For instance, input from a first modality like an eye can be fed to neurons in the neural module 61, input from a second modality like a thermal sensor can be fed to neurons in the neural module 64, and input from a third modality like an auditory sensor can be fed to neurons in the neural module 66.

Figure 6:
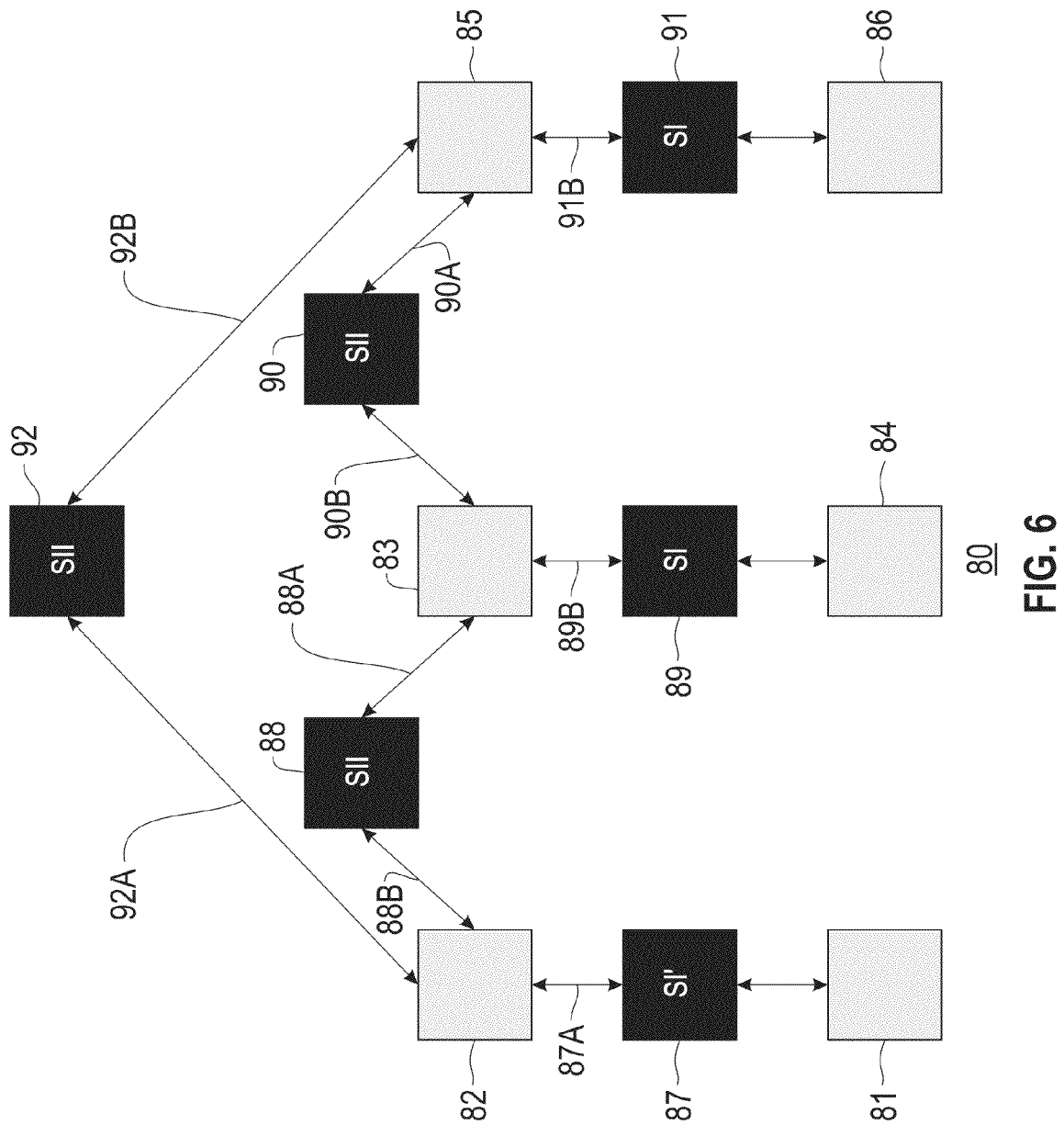
FIG. 6 illustrates a neural network circuit, in accordance with an embodiment of the invention.

FIG. 6 illustrates a neural network circuit 80, in accordance with an embodiment of the invention. The neural network circuit 80 comprises six neural modules, neural modules 81, 82, 83, 84, 85, and 86, and six synapses, synapses 87, 88, 89, 90, 91, and 92. Each neural module 81, 82, 83, 84, 85, and 86 comprises p neurons (see, for example, neural module 200 in FIG. 2B comprising neurons $l_i^\uparrow$, $l_i^\downarrow$, $u_i^\uparrow$, and $u_i^\downarrow$).

The synapse 87 interconnects every neuron in the neural module 81 with a corresponding neuron in the neuron module 82. The synapse 88 interconnects every neuron in the neural module 82 with a corresponding neuron in the neuron module 83. The synapse 89 interconnects every neuron in the neural module 83 with a corresponding neuron in the neuron module 84. The synapse 90 interconnects every neuron in the neural module 83 with a corresponding neuron in the neuron module 85. The synapse 91 interconnects every neuron in the neural module 85 with a corresponding neuron in the neuron module 86. The synapse 92 interconnects every neuron in the neural module 82 with a corresponding neuron in the neuron module 85.

As discussed above, a neural module can have multiple ports. In FIG. 6, the neural module 83 is connected to three different synapses. The neural module 83 is connected to a port 90B of the synapse 90, a port 89B of the synapse 89, and a port 88A of the synapse 88. With respect to synapses 89 and 90, the neural module 83 is a "neural module B". With respect to synapse 88, the neural module 83 is a "neural module A".

As shown in FIG. 6, the neural module 82 is also connected to three different synapses. The neural module 82 is connected to a port 87A of the synapse 87, a port 88B of the synapse 88, and a port 92A of the synapse 92. With respect to the synapses 87 and 92, the neural module 82 is a "neural module A". With respect to the synapse 88, the neural module 82 is a "neural module B".

Further shown in FIG. 6, the neural module 85 is also connected to three different synapses. The neural module 85 is connected to a port 90A of the synapse 90, a port 91B of the synapse 91, and a port 92B of the synapse 92. With respect to the synapses 91 and 92, the neural module 85 is a "neural module B". With respect to the synapse 90, the neural module 85 is a "neural module A".

Further, FIG. 6 represents three different synapse types. The synapses 89 and 91 have the same synapse type SI, each synapse comprising the same set of $p^2$ learning rules. The synapse type SI' of the synapse 87 is a symmetric dual of the synapse type SI. The $p^2$ learning rules in synapses 89 and 91 are reversed to obtain a different set of $p^2$ learning rules for the synapse 87. Finally, the synapses 88, 90 and 92 have the same synapse type SII, each synapse comprising a set of $p^2$ learning rules that differs from the learning rules of 87, 89, and 91.

Similar to the neural network circuit 60 in FIG. 5, the neural network circuit 80 in FIG. 6 can be used to implement a neural network circuit combining multiple sensory and motor modalities into one computational architecture.

Figure 7:
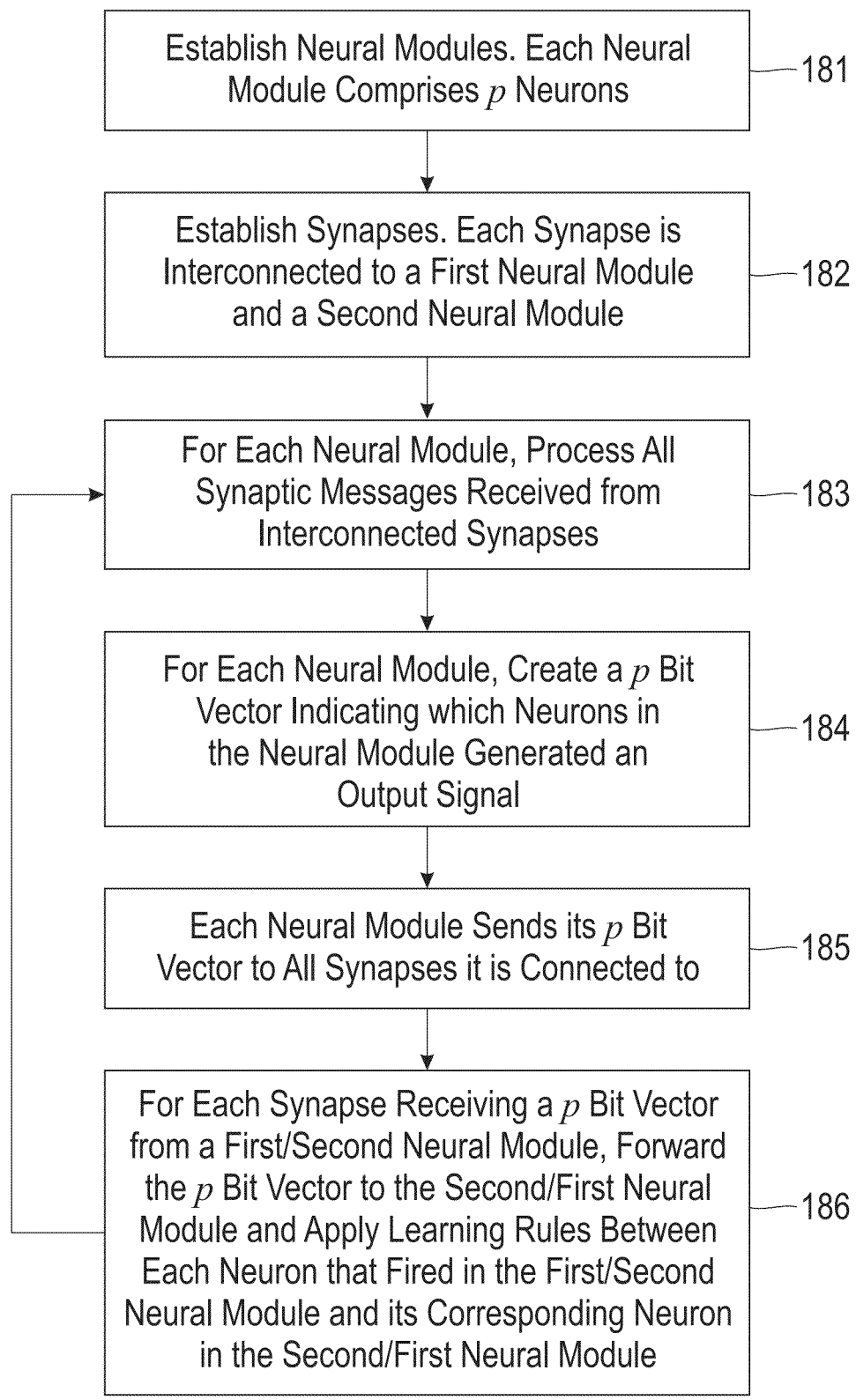
FIG. 7 illustrates a flowchart of an example process for an efficient event-driven design for a neural network circuit, in accordance with an embodiment of the invention.

FIG. 7 illustrates a flowchart of an example process 180 for neural network circuit, in accordance with an embodiment of the invention. In one embodiment, the neural network may comprises a hierarchical routing fabric for neural modules, wherein the routing fabric provides two-way information flow and structural plasticity. Routing of information between the neural modules is adaptive. In one example, each neural module includes a plurality of incoming connections such that each incoming connection has a predetermined address, and each neural module includes a plurality of outgoing connections such that each outgoing connection targets an incoming connection in a neural module among the multiple neural modules. The routing fabric selectively routes signals among the neural modules based on a reconfigurable hierarchical organization. The routing fabric may comprise a routing table for each neural module, wherein each routing table includes routing information for a router to direct an incoming signal to another neural module. In one example, the routing table is within a neural module. In another example, the routing table may be external to the neural module.

In process block 181, the neural modules are established wherein each neural module comprises p neurons. In process block 182, synapses are established, wherein each synapse is interconnected to a first neural module and a second neural module. In process block 183, each neural module processes all synaptic messages received from interconnected synapses. In process block 184, each neural module creates a p bit vector indicating which neurons in the neural module generated an output signal. In process block 185, each neural module sends its p bit vector to all synapses it is connected to. In process block 186, each synapse receiving a p bit vector from a first/second neural module forwards the p bit vector to the second/first neural module and applies learning rules between each neuron that fired in the first/second neural module and its corresponding neuron in the second/first neural module. After process block 186, the invention loops back to process block 183.

Figure 8:
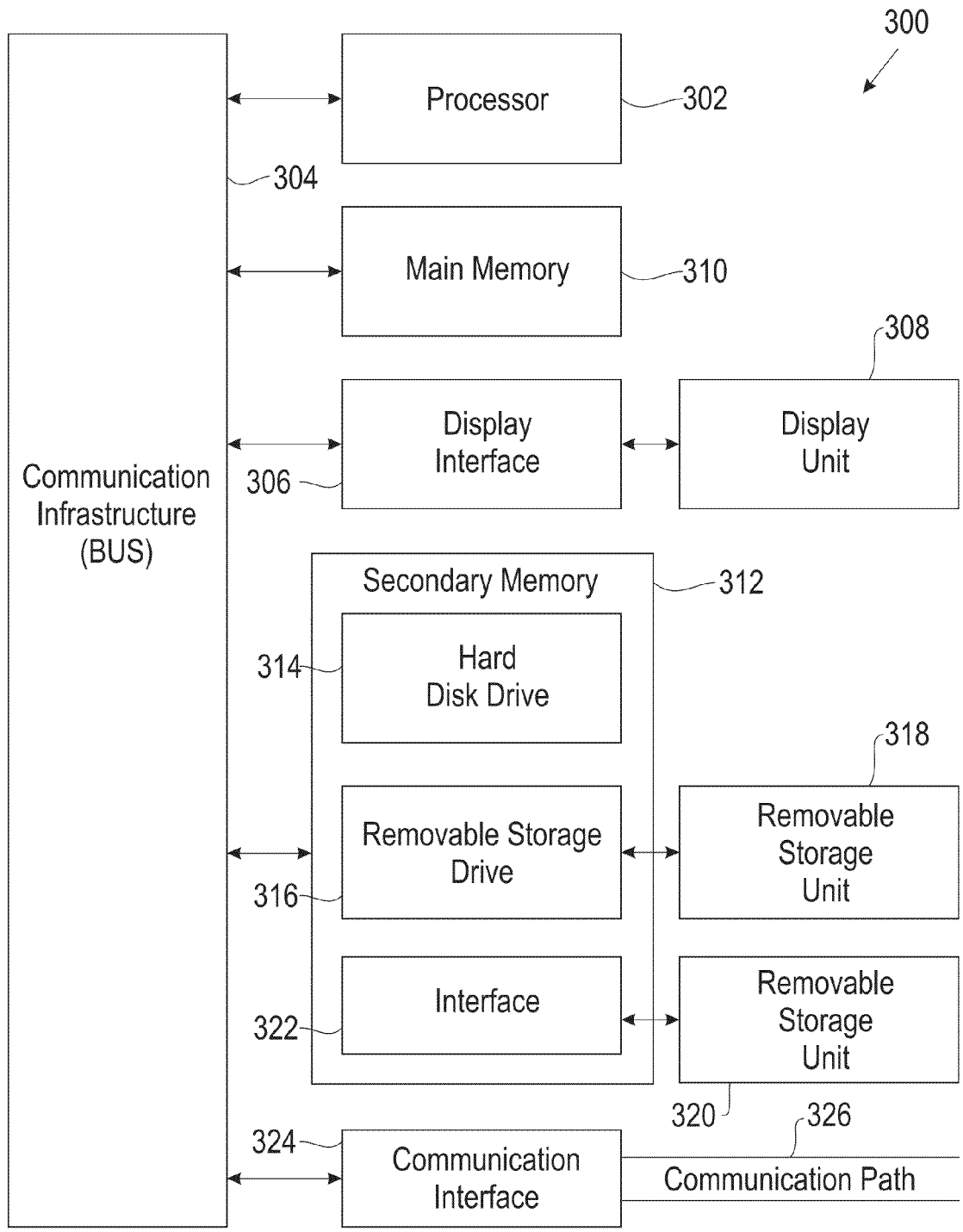
FIG. 8 is a high level block diagram showing an information processing system useful for implementing one embodiment of the present invention.

FIG. 8 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention.

The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neural network circuit, comprising:
a plurality of neural modules, wherein each neural module comprises multiple digital neurons such that each neuron in a neural module has a corresponding neuron in another neural module; and
an interconnection network comprising a plurality of digital synapses that interconnect the plurality of neural modules, wherein each synapse interconnects a first neural module to a second neural module by interconnecting a neuron in the first neural module to a corresponding neuron in the second neural module such that corresponding neurons in the first neural module and the second neural module communicate via the synapses, wherein each synapse comprises a learning rule associating a neuron in the first neural module with a corresponding neuron in the second neural module; and
a control module that generates signals which define a set of time steps for event driven operation of the neurons and event communication via the interconnection network.

2. The neural network circuit of claim 1, wherein each synapse has a weight, a delay, and a synapse type, wherein each synapse type comprises a different set of learning rules.

3. The neural network circuit of claim 2, wherein:
each neuron in a neural module has an operational state; and
based on its operational state, said neuron generates a firing event in response to one or more firing events received as input signals from corresponding neurons in other neural modules via connected synapses, wherein each said input signal is weighted by said weight of the synapse communicating said input signal to said neuron.

4. The neural network circuit of claim 3, wherein at each time step:
each neuron in each neural module updates its operational state and computes whether to generate a firing event; and
each neural module generates a firing event vector indicating which of its neurons generated a firing event, and transmits the firing event vector via a connected synapse to communicate the firing activity to one or more neurons via the interconnection network.

5. The neural network circuit of claim 4, wherein:
a synapse interconnecting the first neural module and the second neural module receives:
- a first firing event vector from the first neural module indicating which neurons in the first neural module generated a firing event; and
- a second firing event vector from the second neural module indicating which neurons in the second neural module generated a firing event.

6. The neural network circuit of claim 5, wherein:
in response to the first vector, said synapse forwards the first vector to the second neural module and applies learning rules associating each firing neuron in the first neural module with a corresponding neuron in the second neural module; and
in response to the second vector, said synapse forwards the second vector to the first neural module and applies learning rules associating each firing neuron in the second neural module with its corresponding neuron in the first neural module.

7. The neural network circuit of claim 6, wherein:
in response to the first vector, said synapse further forwards to the second neural module said weight, said delay, and a previously forwarded weight of said synapse;
in response to the second vector, said synapse further forwards to the first neural module said weight, said delay, and a previously forwarded weight of said synapse.

8. The neural network circuit of claim 7, wherein:
the weights of all synapses in the interconnection network are adaptive as a function of the history of the firing event vectors from the first and the second neural modules.

9. The neural network circuit of claim 8, further comprising:
an interface module configured for updating learning rules in one or more synapses in the interconnection network, wherein each synapse is reconfigurable for learning rules including one or more of: Hebbian, anti-Hebbian, spike-timing-dependent-plasticity (STDP), and anti-STDP.

10. The neural network circuit of claim 9, wherein:
a first learning rule for learning false negatives is applied to a first synapse in the interconnection network when a neuron interconnected with the first synapse generates a firing event; and
a second learning rule for unlearning false positives is applied to a second synapse in the interconnection network when a neuron interconnected with the second synapse generates a firing event.

11. The neural network circuit of claim 10, wherein:
the neural modules are organized into multiple populations of neural modules, wherein:
a first set of neurons within at least one population of neural modules is configured to receive input events from an input interface to the neural network circuit;
a second set of neurons within at least one population of neural modules is configured to generate output events to an output interface of the neural network circuit; and
a third set of neurons within at least one population of neural modules is configured to generate output events to an evaluation module of the neural network circuit, wherein the evaluation module, based on the type of the output events, feeds the output events to a fourth set of neurons within other populations of neural modules.

12. The neural network circuit of claim 11, wherein each neural module comprises four neurons, and each neuron comprises one of: a neuron in a learning, bottom-up pathway; a neuron in a learning, top-down pathway; a neuron in an unlearning, bottom-up pathway; and a neuron in an unlearning, top-down pathway.

13. The neural network circuit of claim 12, wherein:
the interface module updates the learning rules such that the neural network operates as one or more of: an auto-associative system, a hetero-associative system, and a reinforcement learning system.

14. The neural network circuit of claim 1, wherein:
each neuron comprises a reconfigurable digital complementary metal-oxide-semiconductor (CMOS) circuit for logic and memory elements for its operational state;
each synapse between two neural modules comprises a reconfigurable digital CMOS circuit for logic and memory elements for its operational state; and
each synapse between two neural modules comprises a communication link implemented via a combination of logical and physical primitives.

15. A computer program product on a non-transitory computer-readable medium for an efficient, event-driven design for a neural network circuit comprising a plurality of neural modules, wherein each neural module includes multiple digital neurons such that every neuron in a first neural module is connected to a corresponding neuron in a second neural module via an interconnect network of synapses, wherein each synapse includes a learning rule associating a neuron in the first neural module with a corresponding neuron in the second neural module, the computer program product comprising instructions which when executed on a computer cause the computer to perform operations including:
generating signals which define a set of time steps for event-driven operation of the neurons and event communication via the interconnect network;
at each time step, each neuron updating its operational state and determining whether to generate a firing event in response to firing events received as input signals from corresponding neurons in other neural modules, wherein each said input signal is weighted by a synaptic weight of the synapse communicating said input signal to said neuron;
adapting the synaptic weight associated with each synapse as a function of the firing events of the interconnected neurons;
applying a first learning rule for learning false negatives to a first synapse when a neuron interconnected via the first synapse generates a firing event, and applying a second learning rule for unlearning false positives to a second synapse when a neuron interconnected via the second synapse generates a firing event;
a set of neurons generating output events to an evaluation module, wherein based on the type of the output events generated, the output events are fed to another set of neurons; and
updating the learning rules such that the neural network operates as one or more of: an auto-associative system, a hetero-associative system, and a reinforcement learning system.

* * * * *